Figure 1:
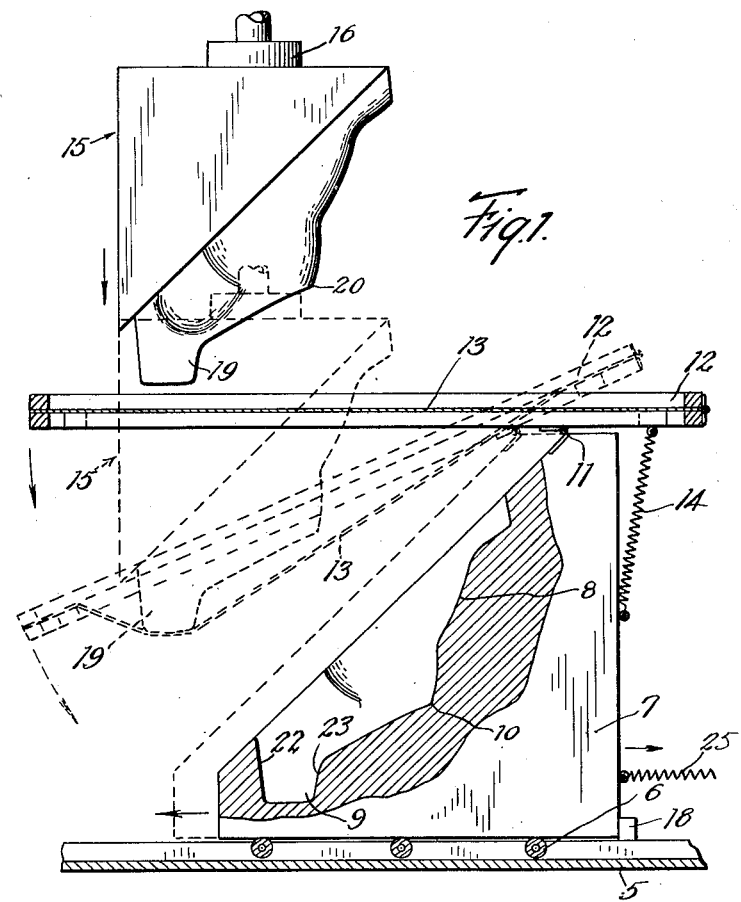

Nov. 14, 1950

G. W. BORKLAND 2,530,043

METHOD AND APPARATUS FOR DRAWING
PLASTIC SHEET MATERIAL
Filed Dec. 3, 1945

Inventor:
Gustave W. Borkland.
By Thiess, Olsen & Mecklenburger
Attys.

Patented Nov. 14, 1950

2,530,043

UNITED STATES PATENT OFFICE 2,530,043

METHOD AND APPARATUS FOR DRAWING PLASTIC SHEET MATERIAL

Gustave W. Borkland, Marion, Ind.

Application December 3, 1945, Serial No. 632,542

11 Claims. (Cl. 18—19)

The present invention relates to an apparatus and method for deeply drawing plastic sheet material particularly when the article to be made therefrom has at least a portion in cupped formation.

The invention also relates to an object consisting of a deeply drawn sheet of plastic or thermoplastic material in which the most deeply drawn portions are characterized by having walls in which the material is molecularly strained as a result of the stretching operation resulting from the drawing operation.

The invention also contemplates a bust portion of a manikin or the like in which the neck and shoulder portions are deeply drawn and the walls thereof are composed of plastic or thermoplastic material which has been molecularly strained as a result of the drawing operation and which is therefore characterized by greater stiffness and rigidity in those portions relative to the less deeply drawn portions of the sheet.

It has already been proposed in the past to mold sheet material, particularly such as is thermoplastic, into cupped formations, this usually having been accomplished by two die members, one a male die member, hereinafter preferentially termed a patrix, and a female die member, hereinafter preferentially termed a matrix.

The sheet material is usually rendered plastic by the expedient of having either or both of the die members heated so as to heat the sheet for the purpose of permitting its deformation. This, however, requires, in the case of thermoplastic material, also means for cooling the sheet, as otherwise it could not be removed from the die without losing the shape which had been imparted thereto.

It has also been proposed, particularly by present applicant, as see for instance his prior Patent No. 2,357,806 of Sept. 12, 1944, to produce cupped formations in thermoplastic sheet material by an expedient which involved firmly clamping the sheet of plastic material in a frame whereby its marginal portions would be prevented from slipping, the sheet being sufficiently preheated so that upon the impingence thereagainst of a suitable male die member its deformation could be accomplished. However, in so doing, extremely deep cupped formations could not be so readily made by reason of the fact that occasionally there would be too much thinning of certain portions of the sheet as a result of the excessive draft thereof with the result that the article made would differ in thickness at various parts, a condition which under some circumstances is undesirable.

To obviate these difficulties, it is now proposed to accomplish the molding or drawing of a thermoplastic sheet material by a method which involves the initial formation of the deeper portions of the cup by an operation in which the sheet while in suitable plastic condition resulting from heating thereof is first partially deformed while in one plane, whereafter the planar relationship of the sheet relative to the die member is altered so that it will not be necessary to draw it quite as drastically in those portions which are not so deeply drawn, all as will be hereinafter more fully described.

One of the objects of the present invention is to provide an improved method and apparatus which can be used in the formation of sheet plastics by a drawing operation whereby forms not readily producible by other methods and apparatus can be formed; particularly such forms in which some portion of the product overhangs the cavity formed in the drawing operation.

Another object of the invention is to provide a method and a suitable apparatus for carrying it out, in which a sheet of plastic material may be formed into an object having a deeply drawn portion, with a considerable overhang relative to the other portions of the object, in which method one of the features comprises changing the angular relationship of the molding die and the sheet that is being drawn, this change being automatically accomplished by reason of the specific construction of the apparatus.

Still another object of the invention is to enable the production of articles having deeply drawn portions which have a considerable overhang, without the necessity of using a contractible die or mold.

A further object of the present invention is to provide one form of suitable apparatus for effecting the method outlined in the previous paragraph.

A still further object of the invention is to provide a device for deeply drawing plastic sheet material, comprising a matrix and a therewith corresponding patrix, the latter being mounted for vertical movement in a direction transverse to the sheet to be drawn, the apparatus also including a frame for supporting the sheet material, the said frame being hingedly mounted on the matrix and the latter provided with means to permit lateral movement thereof so as to finally align it with the patrix.

Other objects of the invention will become apparent from the further detailed description herein below and from the claims appended to the present specification.

Figure 2:
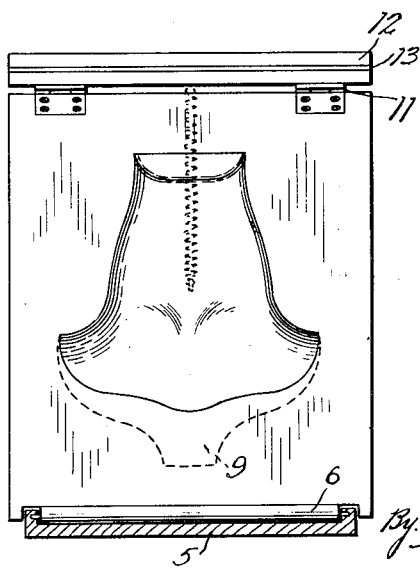

The invention is illustrated purely for purposes of example, by a drawing in which Fig. 1 is a side elevation, partially in section, of one suitable apparatus, in which the method of the present invention may be carried out, this figure also showing in dotted outline the changed position of certain parts, and Fig. 2 is an elevational side view of the apparatus shown at the initiation of the drawing operation, and viewing the apparatus in the direction of the large arrow shown in Fig. 1.

The invention is primarily useful in the formation of deeply drawn objects from deformable plastic material, more particularly of the type which may be properly designated as thermoplastic, and which may, for example, consist of sheets of a suitable cellulose ester or ether such, for example, as cellulose acetate, cellulose acetobutyrate, cellulose ethers such as ethyl cellulose, vinyl ester resins, and various types of acrylic plastic materials such as sheets of methyl methacrylate, or sheets of polystyrene material; although it is to be understood that the sheet material while initially thermoplastic, may also be of a nature which permits of its eventual setting under heat and pressure.

It is further to be understood that when cellulose ester and ethers are specified it is to be understood that in addition to the cellulose ester or ether itself there is or are present the necessary and well known plasticizing agents, and the like which render such material sufficiently thermoplastic to permit of its drawing and deformation when heated above room temperatures. Such sheet material is well known in the art and hence requires no further description.

In all of the further explanation given herein below it is always and invariably to be understood that the sheet prior to being drawn is preheated by any suitable means to a temperature which will allow of the proper depth of drawing thereof without rupture. Temperatures suitable for this purpose vary of course with the various kinds of plastic materials, but in general may be said to lie within the range of from 150° F. to 250° F. and perhaps even 450° F., depending upon the particular material employed. The purveyors of such plastic sheets usually provide the purchaser with detailed information as to the proper temperatures of the working thereof and hence little or no experimentation will be necessary to enable the practice of the present invention once the nature of the plastic material is definitely known.

The invention has found particular utility in the manufacture of relatively large drawn objects, as for instance the bust portions of manikins such as are used for the display of human clothing in show windows, stores and the like, and for that reason, and purely as exemplification of the present invention, the same has been illustrated in connection with the forming of a partial bust of the female figure.

Referring now to the drawing, the apparatus consists of a suitable base 5 upon which there are mounted a plurality of rollers 6 upon which there is mounted, so as to be capable of lateral movement, a matrix frame 7 whose movement in a direction to the right in the drawing is defined by a suitable stop 18; this matrix, which is shown partially in section, may be made of wood or any other suitable material such as metal or a plastic material such as a set gypsum, for example, plaster of Paris. In any event, the matrix block 7 has formed therein a suitable matrix or female die member 8 which in the form illustrated has a cupped portion 9 which in the eventual use of the article formed thereby will form the neck of the bust. The breast portion 10 represents the deepest extent of the drawing other than the neck portion 9, while the rest of the portions do not extend quite as far into the matrix block 7.

Hinged by means of the hinge 11 to the matrix block 7 is the plastic sheet retaining holding means or frame 12, within which the plastic sheet 13 is firmly held on all four marginal portions. The frame 12 is biased so that its greater extent will tend to sweep upwardly, and by proper adjustment of the biasing means may be initially maintained in a substantially horizontal position. The biasing means are shown, purely for purposes of exemplification, as consisting of a spring 14, but it will be obvious that suitable weights or other equivalent means may be employed to effect this purpose.

Mounted above the frame 12 is the patrix broadly designated by the reference numeral 15 and which has an outline which is the obverse of that of the matrix 8. In other words, the head portion 19 of the patrix corresponds to the depression 9 of the matrix, while the breast forming portion 20 corresponds with the depression 10 of the matrix.

The patrix 15 is suitably mounted upon a plunger 16 which is capable of moving vertically downwardly in the direction of the arrow so that the patrix 15 may eventually assume a position in which it will be in coincidental joint engagement with the matrix 8. It will be noticed that the matrix is positioned at a point slightly to the right of the patrix when the latter is in its extreme upper position, and also that the neck forming portion 19 of the patrix lies a short distance above the sheet 13 before the molding operation is allowed to take place.

The operation of the device is substantially as follows: A sheet of plastic deformable material heated to a temperature at which it is freely workable so that it may be drawn without rupture is firmly clamped in the frame 12 so that its marginal edges are definitely held against slipping and deformation. By, for instance, hydraulic means (not herein illustrated) the plunger 16 is caused to move downwardly, pushing the patrix 15 ahead of it so that before long the portion 19 which forms the neck portion of the molded object, and which represents the point of deepest draw, will contact the hot sheet 13. Inasmuch as the resilient means such as the spring 14 resists downward movement of the frame 12, whose outer (left) end is unsupported, the portion 19 will hence tend to push the sheet downwardly so as to begin the formation of the most deeply drawn part. There will therefore result a condition which will cause the frame 12 to pivot about its hinge 11 while at the same time as the result of the fact that the patrix 19 is moving straight downwardly there will be given a lateral movement to the left of the matrix block 7 by reason of its hinged connection at the point 11 with the frame 12 so that gradually the matrix will be moving to the left on its rollers 6. These are preferably made ball-bearing so that but little effort will be required to give this translational movement to the matrix block. By the time the plunger 16 has traveled its utmost distance the portion 19 of the patrix will be in engagement with the depressed portions 9 of the matrix and therefore will give the sheet 13 a shape which corresponds to that respectively of the matrix on one side and the patrix on the other. The sheet is held in that position for a few moments until it has cooled down sufficiently so that it will retain its form, whereafter the plunger 16 is actuated in the opposite direction, that is, straight up, thereby causing the frame 12 to follow it under the influence of the spring 14 so that the frame finally again is in horizontal position. The frame is then opened and the formed article is taken out, this of course having still integrally thereto attached those marginal and peripheral portions of the sheet which have not been distorted or drawn. After the formed sheet has been removed, those flat portions which have not been drawn are trimmed off by any suitable means; thus forming a finished object which has a very deeply drawn cupped portion forming the neck 9 of the bust.

It will be noticed that on the portion of the neck which lies furthest down when the bust is in upright position (just the reverse of that shown in the figures) the portions 22 and 23 of the neck portion 9 will have been stretched considerably more than the rest of the parts of the formed object. Therefore the material, such as the cellulose ester or ether plastic or the like, will be molecularly different in structure than those portions of the sheet which have not been so greatly drawn out of a vertical plane. In other words, there will be a condition of molecular reorientation in the portions 22 and 23 of the neck portion 9, which gives this portion of the object a somewhat greater final rigidity than that of the rest of the object. This is a highly desirable condition as it therefore enables the neck portion to be supported as for example by a metal stand so that the figure may then be used as a portion of a manikin about which to drape, for instance, a woman's dress.

It will of course be understood that the method has been described in connection with such a portion of a manikin purely for exemplificative purposes and that a great many other objects can be made in accordance with the herein disclosed teachings.

It will also be noticed that the matrix block 7 does not automatically return to its initial position but is preferably pushed to the right by hand; when a new molding operation is to be performed its correct location is assured by the aforementioned stop member 18.

It is, however, within contemplation of the invention as illustrated in dotted lines, to provide a further spring member 25 which will force the matrix 7 back against the stop 18.

The operation can, if desired, also be effected by availing of the teachings of my co-pending application No. 537,353, now Patent No. Re. 23,171, issued November 29, 1949, in which suction is applied between the die and the sheet being shaped. Thus, once the sheet has established contact between the projecting portion 19 and the part 20, (i. e. a position slightly further advanced than that shown in dotted lines on Fig. 1), air may be withdrawn through suitable suction-lines established in the patrix, thus drawing the plastic sheet firmly against the die even before it is forced into that position by incidence with the matrix; and it is to be considered as within the scope of the present invention to adopt such a procedure. Claims to that method of molding are in my said co-pending application.

The apparatus of the present invention may be constructed of any suitable material; the frame for example may be made of a non-conducting material such as wood or plastics, which is desirable, as it would not abstract any heat from the material. The material of which the matrix and patrix are made has already been mentioned as some form of cast hard plastic material such as the modern forms of gypsum cements which are very suitable for the purpose. It is advisable to coat these with some material to which the plastic sheet will not adhere, as otherwise there may be an impairment of the natural glossy surface thereof.

While rollers 6 have been shown upon which the matrix may roll, it is of course self evident that it may merely slide upon suitably lubricated rails or other support and that the means for maintaining the frame 12 in its initial position may comprise some means attached to the free end thereof as for example by a suitable pulley and counterweight. In other words, the exact mechanical details illustrated are not to be considered as limitations of the invention, for which applicant claims:

1. Device for deeply drawing plastic sheet material, comprising a matrix and a therewith corresponding patrix, the latter being mounted for vertical movement transversely of the sheet to be drawn, a frame for supporting the sheet material, said frame being hingedly mounted on said matrix, means for slidably supporting said matrix to align it with the patrix when juxtaposed thereto and means for resiliently biasing said frame toward said patrix.

2. Device for deeply drawing plastic sheet material which comprises an obliquely disposed matrix, a vertically reciprocably movable patrix corresponding therewith, a normally horizontally disposed plastic sheet-holding frame hingedly attached to said matrix, means, comprising rollers, for supporting said matrix in horizontally slidable position, and means biasing said frame to cause it to tend to assume a horizontal position.

3. A molding device comprising a horizontal support, rollers mounted thereon, a matrix block supported on said rollers, a frame hinged to said matrix block and capable of assuming any position between horizontal and downwardly inclined up to an angle of about 45°, resilient means biasing said frame toward a horizontal position, and a male die member mounted for vertical movement.

4. In a molding device the combination of a vertically reciprocably movable male die member, a horizontally movable female die member capable of registering therewith and a therebetween interposed hingedly mounted frame for supporting a plastic sheet intended for deformation by said die members, said frame being normally resiliently biased toward said male die member.

5. Apparatus for drawing a sheet of thermoplastic material comprising a rectilinearly reciprocable male die member, a frame for securing the edge portions of a sheet to hold it flat and extending across the path of said die preparatory to the drawing operation, and means for mounting said frame for rocking movement so as to permit variation of the angle of the line of pressure of the die on the sheet.

6. Apparatus for drawing a sheet of thermoplatistic material comprising a rectilinearly reciprocable male die member, a frame for securing the edge portions of a sheet to hold it flat and extending across the path of said die preparatory to the drawing operation, and means for mounting said frame for rocking movement caused by the action of the die on the sheet to vary the angle of the line of pressure of the die on the sheet.

7. Apparatus for drawing a sheet of thermoplastic material comprising a rectilinearly reciprocable male die member, a frame for securing the edge portions of a sheet to hold it flat and extending across the path of said die preparatory to the drawing operation, and means for mounting said frame for reciprocation transversely with respect to the path of movement of said die member so as to permit variation of the position of the sheet with respect to said path.

8. Apparatus for drawing a sheet of thermoplastic material comprising a rectilinearly reciprocable male die member, a frame for securing the edge portions of a sheet to hold it flat and extending across the path of said die preparatory to the drawing operation, and means for mounting said frame for reciprocation transversely with respect to the path of movement of said die member caused by the action of the die on the sheet to vary the position of the sheet with respect to said path.

9. Apparatus for drawing a sheet of thermoplastic material comprising a rectilinearly reciprocable male die member, a frame for securing the edge portions of a sheet to hold it flat and extending across the path of said die preparatory to the drawing operation, and means for mounting said frame for rocking movement to vary the angle of the line of pressure of the die on the sheet and for reciprocation transversely with respect to the path of movement of said die member to vary the position of the sheet with respect to said path.

10. A method of drawing a sheet of thermoplastic material which comprises effecting rectilinear movement of translation of a male die member, securing the edge of a flat sheet of thermoplastic material against lateral slipping, holding the flat sheet in the path of movement of the die, and rocking the sheet when engaged by the die to vary the angle of the line of pressure of the die on the sheet.

11. A method of drawing a sheet of thermoplastic material which comprises effecting rectilinear movement of translation of a male die member, securing the edge of a flat sheet of thermoplastic material against lateral slipping, holding the flat sheet in the path of movement of the die, and moving the sheet transversely of the line of movement of the die to control the action of the die on the sheet.

GUSTAVE W. BORKLAND.

REFERENCES CITED

The following references are of record in the file of this patent:

UNITED STATES PATENTS

| Number | Name | Date |
|---|---|---|
| 858,096 | Murdock | June 25, 1907 |
| 1,417,743 | Kempton | May 30, 1922 |
| 1,451,998 | Neubauer | Apr. 17, 1923 |
| 1,764,215 | Kupper | June 17, 1930 |
| 2,014,436 | Jacobson | Sept. 17, 1935 |
| 2,183,983 | Bostwick | Dec. 19, 1939 |
| 2,282,423 | Kopitke | May 12, 1942 |
| 2,332,926 | May et al. | Oct. 26, 1943 |
| 2,357,806 | Borkland | Sept. 12, 1944 |
| 2,386,641 | Trockle | Oct. 9, 1945 |
| 2,428,878 | Johnson | Oct. 14, 1947 |

FOREIGN PATENTS

| Number | Country | Date |
|---|---|---|
| 722,347 | France | Mar. 15, 1932 |